Patented Apr. 8, 1924.

1,489,328

UNITED STATES PATENT OFFICE.

MARTIN L. MARTUS, OF WOODBURY, CONNECTICUT.

PRIMARY BATTERY DEPOLARIZER.

No Drawing. Application filed December 12, 1921. Serial No. 521,658.

*To all whom it may concern:*

Be it known that MARTIN L. MARTUS, a citizen of the United States, and resident of Woodbury, in the county of Litchfield and State of Connecticut, has invented certain new and useful Improvements in Primary Battery Depolarizers, of which the following is a specification.

My invention relates to new and useful improvements in depolarizers for voltaic cells and refers more particularly to a new composition or mixture for producing said element.

While it is recognized that both the oxides of metals as well as the sulphides may be used in a depolarizer to good effect, yet I find that their efficiency is limited. I also find that when the sulphides are used alone as a depolarizer they are very active under certain conditions and cause a clogging or retarding action on the decomposition of the positive element on account of formation of excess amount of hydrogen.

My experiments have also shown that the best results are accomplished when the oxide and the sulphide of the metal are used together, or when I can use in place of the sulphide an oxysulphide produced from various metal oxides in chemical combination with a metal sulphide or sulphides. The proportion of the oxide and sulphide or oxysulphide may vary from (50 to 50) that is, equal parts of each, to a very small percentage of one and a large percentage of the other, say (95 to 5). When the larger percentage of one is used, I prefer to use larger amount of the oxide, and smaller amount of the sulphide or oxysulphide. Any of these proportions seem to overcome the above mentioned objections and therefore I do not care to be restricted as I find it practical for my purpose to use it either way.

I am aware that sulphides of lead, iron and copper have been used heretofore for battery work, but find that they are not commercially successful, due to the fact that they were used by themselves separately. By the mixture of sulphur with an oxide of metal as copper oxide, and burning it, oxysulphide will be produced, and either this, or a sulphide of metal, or both, may be used as an element, or elements, of the present composition. The oxysulphide can be bought as a commercial product. By the mechanical mixture of the sulphides or oxysulphides of these metals with the proper proportion of the oxide, in any desirable percentage for obtaining the most efficiency, a product is obtained which may be either used in its granular form, or pressed into shapes by hydraulic presses, in the usual manner.

I am aware that a depolarizer has been produced by treating oxide of metal with sulphur, the result being oxysulphide, but so far as I know, no one has ever mechanically mixed oxide of metal, a sulphide of metal, as for instance, copper, and an oxysulphide of metal to make a depolarizer; or either the sulphide or oxysulphide with the oxide.

The composition has the advantage of the steady working of a copper oxide combined with the relatively high voltage due to the oxysulphide or sulphide; and furthermore, the voltage may be controlled according to the proportion in which the ingredients are mixed. It is also possible to make one part of a plate of higher voltage than the other by proportioning the ingredients in such parts accordingly.

My improved depolarizer may be used in connection with any of the well known and suitable electrolytes, such as potassium or sodium hydroxid, various sulphides, sulphates or dilute acids. I do not desire to be restricted as to the form of depolarizer, as the same may be used in granular or flaky state in a suitable container or may be compressed, into plate, rod or cylindrical form, with suitable supporting means and in connection with a positive element having suitable means for suspending same in battery jar.

What I therefore claim is:

1. A battery depolarizer comprising a mechanical mixture of an oxide of copper, a sulphide of a metal and an oxide.

2. A battery depolarizer comprising a mechanical mixture of a multiplicity of oxides of metals combined with a sulphide of a metal.

Signed at Bridgeport in the county of Fairfield and State of Connecticut this seventh day of December, A. D., 1921.

MARTIN L. MARTUS.

Witnesses:
HARRY T. HUBERT,
PAUL F. SCHOENMEHL.